US009774434B2

(12) United States Patent
Pani et al.

(10) Patent No.: US 9,774,434 B2
(45) Date of Patent: *Sep. 26, 2017

(54) METHOD AND APPARATUS FOR SUPPORTING AMD RE-SEGMENTATION

(71) Applicant: Intel Corporation, Santa Clara, CA (US)

(72) Inventors: Diana Pani, Montreal (CA); Christopher R. Cave, Montreal (CA); Stephen E. Terry, Northport, NY (US); Paul Marinier, Brossard (CA)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,961

(22) Filed: Nov. 24, 2014

(65) Prior Publication Data
US 2015/0139129 A1 May 21, 2015

Related U.S. Application Data

(63) Continuation of application No. 12/905,320, filed on Oct. 15, 2010, now Pat. No. 8,897,216, which is a (Continued)

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0007* (2013.01); *H04L 1/1874* (2013.01); *H04L 1/1896* (2013.01); *H04W 4/18* (2013.01)

(58) Field of Classification Search
None
See application file for complete search history.

(56) References Cited

U.S. PATENT DOCUMENTS

| 6,724,777 | B1 | 4/2004 | Yamazaki et al. |
| 7,054,270 | B2 | 5/2006 | Yi et al. |

(Continued)

FOREIGN PATENT DOCUMENTS

| TW | 200507470 A | 2/2005 |
| TW | 200525375 A | 5/2005 |

(Continued)

OTHER PUBLICATIONS

3GPP TR 25.999, "Technical Specification Group Radio Access Network; High Speed Packet Access (HSPA) evolution; Frequency Division Duplex (FDD) (Release 7)", V7.0.1, Dec. 2007, 58 pages.

(Continued)

*Primary Examiner* — Sulaiman Nooristany
(74) *Attorney, Agent, or Firm* — Stoel Rives LLP

(57) ABSTRACT

A method and apparatus for acknowledge mode data (AMD) re-segmentation are disclosed. An AMD protocol data unit (PDU) is generated from at least one RLC SDU. The AMD PDU size is within a flexible maximum AMD PDU size. The original AMD PDU is stored in a retransmission buffer, and transmitted. If transmission of the original AMD PDU fails and the original AMD PDU size is larger than an updated maximum AMD PDU size, the original AMD PDU is segmented to segmented AMD PDUs. If transmission of one of the segmented AMD PDUs fails, the original AMD PDU may be re-segmented to smaller size AMD PDUs.

20 Claims, 2 Drawing Sheets

Related U.S. Application Data continuation of application No. 12/023,547, filed on Jan. 31, 2008, now Pat. No. 7,817,669.

(60) Provisional application No. 60/887,667, filed on Feb. 1, 2007.

(51) Int. Cl.
*H04L 1/18* (2006.01)
*H04W 4/18* (2009.01)

(56) References Cited

U.S. PATENT DOCUMENTS

| | | | |
|---|---|---|---|
| 7,130,295 | B2 | 10/2006 | Kim et al. |
| 7,817,669 | B2 | 10/2010 | Pani et al. |
| 8,897,216 | B2 | 11/2014 | Pani et al. |
| 2002/0048281 | A1 | 4/2002 | Yi et al. |
| 2003/0007480 | A1 | 1/2003 | Kim et al. |
| 2004/0233883 | A1 | 11/2004 | Ludwig et al. |
| 2005/0153730 | A1* | 7/2005 | Turetzky ............... G01S 5/0009 455/550.1 |
| 2006/0251105 | A1 | 11/2006 | Kim et al. |
| 2007/0060139 | A1* | 3/2007 | Kim ...................... H04L 1/1841 455/445 |
| 2007/0091810 | A1* | 4/2007 | Kim ...................... H04L 1/1635 370/236 |
| 2007/0110101 | A1 | 5/2007 | Wu |
| 2007/0147315 | A1 | 6/2007 | Khoury et al. |
| 2007/0253447 | A1 | 11/2007 | Jiang |
| 2007/0291788 | A1 | 12/2007 | Sammour et al. |
| 2008/0037588 | A1 | 2/2008 | Yi |
| 2008/0049754 | A1 | 2/2008 | Kim et al. |
| 2008/0101312 | A1 | 5/2008 | Suzuki et al. |
| 2008/0101411 | A1* | 5/2008 | Takahashi ............. H04L 1/1896 370/473 |
| 2008/0130580 | A1 | 6/2008 | Chaponniere et al. |
| 2008/0215948 | A1 | 9/2008 | Pinheiro et al. |
| 2008/0219291 | A1 | 9/2008 | Obuchi et al. |
| 2008/0293416 | A1 | 11/2008 | Yi et al. |
| 2009/0036061 | A1 | 2/2009 | Chun et al. |
| 2010/0074276 | A1* | 3/2010 | Bergstrom ............. H04L 47/10 370/471 |

FOREIGN PATENT DOCUMENTS

| | | |
|---|---|---|
| WO | 0005911 A1 | 2/2000 |
| WO | 0052831 A1 | 9/2000 |
| WO | 0105121 A1 | 1/2001 |
| WO | 2004043017 A2 | 5/2004 |
| WO | 2006043746 A1 | 4/2006 |
| WO | 2008094662 A2 | 8/2008 |

OTHER PUBLICATIONS

3GPP TR 25.999, "Technical Specification Group Radio Access Network; HSPA Evolution (FDD); (Release 7)", V1.0.0, Nov. 2006, 43 pages.

3GPP TS 25.322, "Technical Specification Group Radio Access Network; Radio Link Control (RLC) protocol specification (Release 1999)", V3.18.0, Jun. 2004, 75 pages.

3GPP TS 25.322, "Technical Specification Group Radio Access Network; Radio Link Control (RLC) protocol specification (Release 4)", V4.12.0, Jun. 2004, 78 pages.

3GPP TS 25.322, "Technical Specification Group Radio Access Network; Radio Link Control (RLC) protocol specification (Release 5)", V5.13.0, Dec. 2005, 78 pages.

3GPP TS 25.322, "Technical Specification Group Radio Access Network; Radio Link Control (RLC) protocol specification (Release 6)", V6.10.0, Jun. 2007, 86 pages.

3GPP TS 25.322, "Technical Specification Group Radio Access Network; Radio Link Control (RLC) protocol specification (Release 7)", V7.5.0, Dec. 2007, 88 pages.

3GPP TS 25.322, "Technical Specification Group Radio Access Network; Radio Link Control (RLC) protocol specification (Release 7)", V7.2.0, Sep. 2006, 86 pages.

3GPP TS 25.322, "Technical Specification Group Radio Access Network; Radio Link Control (RLC) protocol specification (Release 8)", V8.0.0, Dec. 2007, 89 pages.

3GPP TS 36.213, "Technical Specification Group Radio Access Network; Evolved Universal Terrestrial Radio Access (E-UTRA); Physical layer procedures (Release 8)", V8.0.0, Sep. 2007, 13 pages.

3GPP TS 36.213, "Technical Specification Group Radio Access Network; Physical layer procedures (Release 8)", V0.2.0, Oct. 2006, 86 pages.

3GPP TS 36.322, "Technical Specification Group Radio Access Network; Evolved Universal Terrestrial Radio Access (E-UTRA) Radio Link Control (RLC) protocol specification (Release 8)", V8.0.0, Dec. 2007, 35 pages.

Ericsson, "EDGE: Concept Proposal for Enhanced GPRS Revision 1.5", ETSI SMG2 Working Session on EDGE TDoc SMG2 EDGE 006/99, Toulouse, France, Mar. 2-4, 1999, 16 pages.

PCT/US2008/001305, "International Preliminary Report on Patentability", Aug. 1, 2009, 16 pages.

PCT/US2008/001305, "International Search Report and Written Opinion", Dec. 16, 2008, 21 pages.

Samsung Electronics, "HSPA + User Plane Enhancements", R2-070125, 3GPP TSG RAN WG2#56-bis, Sorrento, Italy, Jan. 15-19, 2007, 3 pages.

Taiwanese Patent Application No. 100105549, Taiwanese Office Action with English Translation, Oct. 21, 2013, 11 pages.

U.S. Appl. No. 14/818,118, Non-Final Office Action, Feb. 17, 2016, 15 pages.

U.S. Appl. No. 14/818,118, Final Office Action, May 13, 2016, 15 pages.

U.S. Appl. No. 14/818,118, Non-Final Office Action, Oct. 3, 2016, 16 pages.

U.S. Appl. No. 14/818,118, Final Office Action, Jan. 5, 2017, 13 pages.

U.S. Appl. No. 14/818,118, et al., Non-Final Office Action, Mar. 21, 2017, 16 pages.

U.S. Appl. No. 14/818,118, Notice of Allowance, dated Jun. 22, 2017, 12 pages.

\* cited by examiner

METHOD AND APPARATUS FOR SUPPORTING AMD RE-SEGMENTATION

CROSS REFERENCE TO RELATED APPLICATION

This application is a continuation of U.S. patent application Ser. No. 12/023,547, filed on Jan. 31, 2008, which claims the benefit of U.S. provisional application No. 60/887,667 filed Feb. 1, 2007, which is incorporated by reference as if fully set forth.

FIELD OF INVENTION

The present invention is related to wireless communications.

BACKGROUND

Some of the goals of high speed packet access (HSPA) evolution include higher data rates, higher system capacity and coverage, enhanced support for packet services, reduced latency, reduced operator costs and backward compatibility. Meeting these goals requires evolutions to the radio interface protocol and network architecture. More specifically, meeting these goals has required a set of enhancements and architecture changes to layer 2 radio link control (RLC) and medium access control (MAC) functionalities.

In universal terrestrial radio access (UTRA) Release 6, an acknowledged mode (AM) RLC entity performs segmentation and concatenation of RLC service data units (SDUs) into fixed-size RLC packet data units (PDUs). The RLC PDU size is semi-static and can only be changed via higher layer signaling. The AM RLC entity is always re-established if the AM PDU size is changed by the higher layer. However, in the evolved HSPA architecture, in order to support high data rates, it has been proposed to have a flexible RLC PDU size that varies to reflect channel conditions. A flexible RLC PDU size increases RLC transmission and retransmission efficiency.

Flexible RLC PDU size will allow the radio network controller (RNC) to create RLC PDUs that closely reflect the channel conditions. A one-to-one mapping between an RLC PDU and a MAC PDU achieves the highest transmission efficiency. A bigger RLC PDU size may have a detrimental effect on the RLC transmission efficiency in bad channel conditions. Having a flexible PDU size would eliminate this problem since for the first RLC PDU transmission the size will reflect the current specified channel conditions, (i.e., max RLC PDU size).

However, when the RLC PDU size of the retransmission is larger than the current specified maximum RLC PDU size, a problem may occur for retransmission of the RLC PDU. If the channels conditions change dramatically the large RLC PDU may never be successfully transmitted. In addition, when a handover from Release 7 to Release 6 occurs, RLC PDUs created in Release 7 RLC might be larger than the new fixed RLC PDU size.

SUMMARY

A method and apparatus for acknowledge mode data (AMD) re-segmentation are disclosed. An AMD protocol data unit (PDU) is generated from at least one RLC SDU. The AMD PDU size is within a flexible maximum AMD PDU size. The original AMD PDU is stored in a retransmission buffer, and transmitted. If transmission of the original AMD PDU fails and the original AMD PDU size is larger than an updated maximum AMD PDU size, the original AMD PDU is segmented to segmented AMD PDUs. If transmission of one of the segmented AMD PDUs fails, the original AMD PDU may be re-segmented to smaller size AMD PDUs.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The following terminology will be used in this disclosure. An original RLC PDU means the first transmitted RLC PDU. A segmented RLC PDU means a first segmented RLC PDU of the original RLC PDU. A re-segmented RLC PDU means a second or later segmented RLC PDU of the original RLC PDU. Sub-segments mean segments of the segmented RLC PDU or re-segmented RLC PDU. The embodiments disclosed herein are applicable to both uplink (UL) and downlink (DL).

Figure 1:
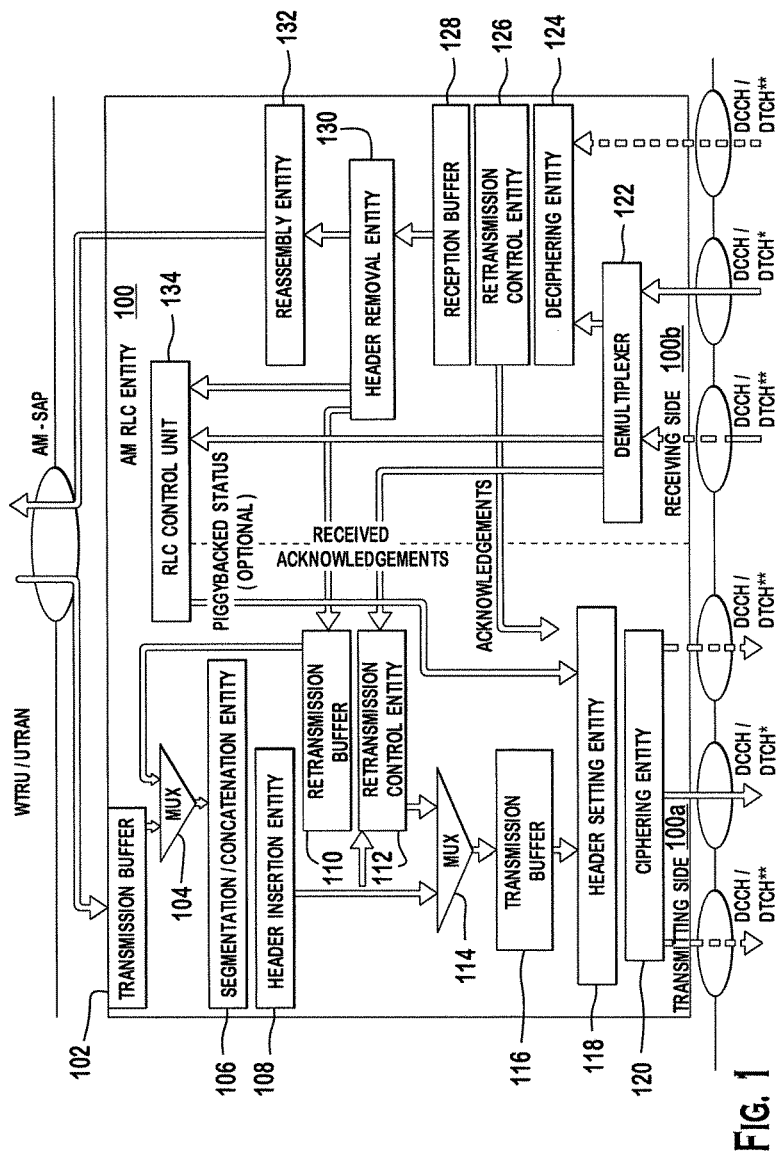
FIG. 1 is an example acknowledged mode (AM) RLC entity supporting RLC re-segmentation.

FIG. 1 is an example AM RLC entity 100 supporting RLC re-segmentation. The AM RLC entity 100 may be included in a WTRU or a network node, (e.g., a radio network controller (RNC) or Node-B, or any other network node). The AM RLC entity is configured for flexible RLC PDU size operation, where the AMD PDU size is variable between a minimum and maximum RLC PDU size. The maximum RLC PDU size used throughout this invention can be a semi-static parameter configured by a radio resource control (RRC) or a variable sized determined by the transmitter and adapted to radio conditions.

The AM RLC entity 100 includes a transmitting side 100*a* and a receiving side 100*b*. A peer AM RLC entity also includes a transmitting side and a receiving side. In the transmitting side 100*a*, the AM RLC entity 100 receives RLC SDUs from upper layers through an AM-service access point (SAP). The RLC SDUs may be stored in a transmission buffer 102 prior to segmentation and/or concatenation. The RLC SDUs are delivered to a segmentation/concatenation entity 106 via a multiplexer 104.

The RLC SDUs are segmented and/or concatenated by the segmentation/concatenation entity 106 into AMD PDUs of a flexible length as specified by an RRC entity or a Node-B. The segmentation and/or concatenation of RLC SDUs is performed as in conventional art. After segmentation and/or concatenation, an RLC PDU header is added by an RLC header insertion entity 108.

The RLC PDU is then sent to a transmission buffer 116 via a multiplexer 114. The RLC PDU is also stored in a retransmission buffer 110 for retransmission. The multiplexer 114 multiplexes RLC PDUs from the retransmission buffer 110 that need to be retransmitted and the newly generated RLC PDUs delivered from the segmentation/concatenation entity 106.

A retransmission control entity either 112 deletes or retransmits the RLC PDUs buffered in the retransmission buffer 110 based on the status report sent by a peer AM RLC entity. The status report may contain a positive acknowledgement (ACK) or a negative acknowledgement (NACK) of individual RLC PDUs received by the peer AM RLC entity. If a NACK is received for a particular RLC PDU, the retransmission control entity 112 may either retransmit the RLC PDU directly via the multiplexer 114, or may send the RLC PDU to the segmentation/concatenation entity 106 via the multiplexer 104 for re-segmentation of the RLC PDU. When the RLC PDU in the retransmission buffer 110 needs to be retransmitted, (i.e., a NACK is received), the retransmission control entity 112 determines whether the RLC PDU size is greater than the current (updated) maximum RLC PDU size at the time retransmission is necessary. The RLC PDU size may be simply compared to the maximum RLC PDU size. Alternatively, the retransmission control entity 112 may determine whether a difference of the RLC PDU size and the maximum RLC PDU size exceeds a threshold value, (i.e., (the RLC PDU size–the maximum RLC PDU size)>a threshold value). The retransmission control entity 112 may also determine whether the number of re-segmentation of the RLC PDU has exceeded a maximum allowed number.

If the RLC PDU size is not greater than the current maximum RLC PDU size, or the number of re-segmentation has exceeded the maximum allowed number, the RLC PDU stored in the retransmission buffer 110 is forwarded directly to the transmission buffer 116 for retransmission. If the RLC PDU size is greater than the current maximum RLC PDU size and the number of re-segmentation has not exceeded the maximum allowed number, the RLC PDU or the RLC SDU corresponding to the RLC PDU may re-segmented, which will be explained in detail below.

A header setting entity 118 completes the AMD PDU header of the RLC PDU stored in the transmission buffer 116. The AMD PDU header is completed based on the input from the RLC control unit 134 that indicates the values to set in various fields, (e.g., polling bit). The header setting entity 118 also multiplexes, if required, control PDUs received from the RLC control unit 134, (e.g., RESET and RESET ACK PDUs), and from a reception buffer 128, (e.g., piggybacked STATUS or STATUS PDUs), with RLC PDUs. The RLC PDU may be ciphered by a ciphering entity 120. The transmitting side 100a of the AM RLC entity 100 submits AMD PDUs to a lower layer through a logical channel, (e.g., dedicated control channel (DCCH) and dedicated traffic channel (DTCH)).

In the receiving side 100b, the AM RLC entity 100 receives the AMD PDUs through the configured logical channels from the lower layer. A received ACK is delivered to the retransmission control entity 112, and the AMD PDUs are routed to the deciphering entity 124 or to the RLC control unit 134 via the demultiplexer 122. The RLC PDUs are deciphered by the deciphering entity 124 (if ciphering is configured), and then delivered to the reception buffer 128.

The AMD PDUs are placed in the reception buffer 128 until a complete RLC SDU has been received. The retransmission control entity 126 in the receiving side 100b of the RLC entity 100 acknowledges successful reception of an AMD PDU, or requests retransmission of a missing AMD PDU by sending a STATUS PDU to the transmitting side. An RLC header is removed by an RLC header removal entity 130. If a piggybacked STATUS PDU is found in the received AMD PDU, it is delivered to the retransmission control entity 112 of the transmitting side 100a of the AM RLC entity 100 to purge the retransmission buffer 110 of positively acknowledged AMD PDUs, and to indicate which AMD PDUs need to be retransmitted. Once a complete RLC SDU has been received, the associated AMD PDUs are reassembled by the reassembly entity 132 and delivered to upper layers through the AM-SAP.

The receiving side 100b of the RLC entity 100 may reassemble segmented RLC SDUs or (re)segmented RLC PDUs, and report status of the segmented RLC SDUs or (re)segmented RLC PDUs to the peer RLC entity.

Re-segmentation of RLC PDU or RLC SDU and header formats are explained hereinafter.

In accordance with a first embodiment, the RLC PDU stored in the retransmission buffer 110 is re-segmented to fit into the new maximum RLC PDU size. An original RLC PDU is stored in the retransmission buffer 110 at the time of initial transmission. If the original RLC PDU is not successfully transmitted, the original RLC PDU is retransmitted. If, due to the change of the maximum RLC PDU size, the original RLC PDU size is greater than the current maximum RLC PDU size (and optionally the number of re-segmentation has not exceeded the maximum allowed number), the original RLC PDU is delivered to the segmentation/concatenation entity 106 and segmented into smaller size segmented RLC PDUs. The segmented RLC PDUs are stored in the retransmission buffer 110.

To support segmentation of the original RLC PDU, additional header information may be included in the segmented RLC PDU. The sequence number (SN) of the original RLC PDU is reused for all segmented RLC PDUs. The header information of the original RLC PDU has to be included at least in one of the segmented RLC PDUs. A segmentation field indicating the segmented RLC PDUs may be included, (e.g., two or three bits to indicate up to 4 or 8 segments). A field indicating the last segment of the original RLC PDU may be included. Alternatively, a field indicating the number of segments of the RLC PDU may be included.

In addition, an indication that the current packet is a segmented RLC PDU may be included. Several options are possible for this indication. A currently reserved bit sequence of the header extension (HE) field in the conventional RLC header may be used. For instance, the sequence "11" is currently reserved. The sequence "110" may be used to indicate that the PDU is a segmented RLC PDU, while the sequence "111" is reserved for future use. Alternatively, a special bit sequence may be used for the length indicator, followed by the flag for the last segment. Alternatively, a 1 bit field (segmentation flag) may be added to the RLC header for the new version of the RLC protocol for this purpose (this field may be present in every RLC PDU).

The first embodiment may be applied to re-segmentation of the original RLC PDU and sub-segmentation of the segmented RLC PDU. When the segmented RLC PDU needs to be retransmitted and the segmented RLC PDU size is greater than the current maximum RLC PDU size, the segmented RLC PDU may be further re-segmented, (i.e., sub-segmentation). All sub-segments are stored in the retransmission buffer and are discarded when an ACK for each sub-segment is received from the peer RLC entity.

To support re-segmentation of the segmented RLC PDUs, the following information may be added to the header of the sub-segments.

Sub-segment information. Sub-segment information describes the segment such that the receiving entity can reconstruct to the segment or original PDU. This information may include any of the following: total number of segments (or sub-segments), segment number (or sub-segment number), segment size (or sub-segment size), segment (or sub-segment) start byte (indicating the position of the first byte of the segment of the segmented packet or original PDU), segment (or sub-segment) last byte (indicating the position of the last byte of the segment of the segmented packet or original PDU), etc. A limit to the amount of times re-segmentation is performed may be configured;

An indication that the packet is a sub-segment, (e.g., a bit appended to the RLC PDU segment indication); and A field indicating the number of sub-segments.

If the segmented RLC PDU size exceeds the current maximum RLC PDU size, the original RLC PDU may be segmented once again in a different RLC PDU size, (i.e., re-segmentation), instead of sub-segmenting the segmented RLC PDU. The re-segmented RLC PDUs are stored in the retransmission buffer 110 for retransmission. The segmented RLC PDU or segments of the first or previous segmentation are discarded from the retransmission buffer 110. For re-segmentation purpose, the original RLC PDU may be maintained in the retransmission buffer. To support this scheme, a version indicator is added to the header information of the re-segmented RLC PDU to indicate the segmentation version of the RLC PDU, (i.e., the number that the RLC PDU has been segmented). Every time the original RLC PDU is segmented or re-segmented, the version indicator is incremented by one. A limit to the number of segmentation may be configured (depending on the number of bits allocated for the version indicator, 1 or 2 bits may be used).

Figure 2:
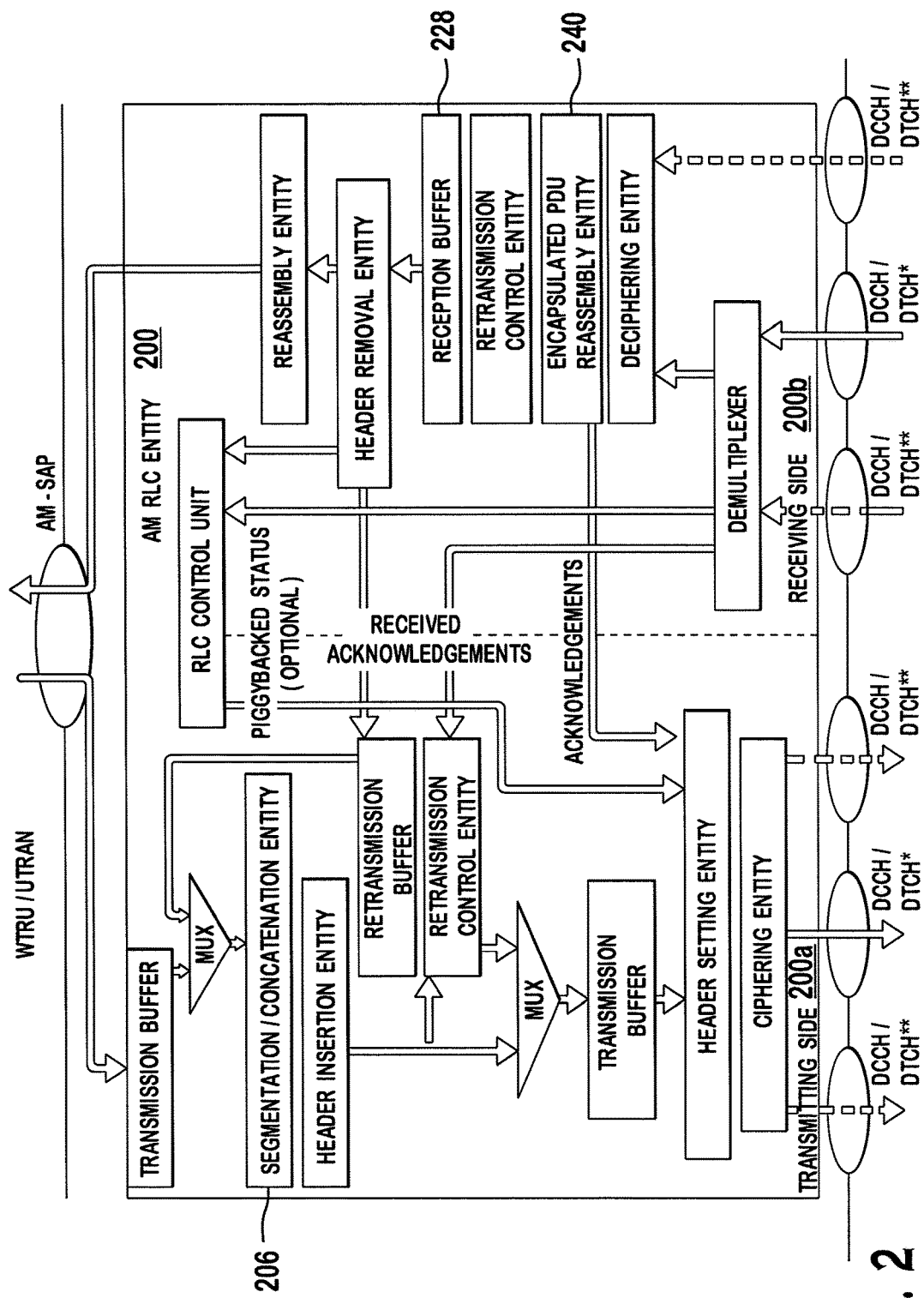
FIG. 2 is an example AM RLC entity supporting RLC re-segmentation in accordance with the second embodiment.

FIG. 2 is an example AM RLC entity 200 supporting RLC re-segmentation in accordance with the second embodiment. In accordance with a second embodiment, a negatively acknowledged RLC PDU at the time the maximum RLC PDU size is reduced in the retransmission buffer 210 and is moved to the segmentation/concatenation entity 206 and processed as a new RLC SDU. The negatively acknowledged RLC PDU is processed in the same way as normal RLC SDUs, (i.e., segmented and/or concatenated), except for an indication in the header. The encapsulated PDUs resulting from this scheme are assigned normal sequence numbers, (i.e., following the same sequence as other RLC PDUs). Preferably, only negatively acknowledged PDUs whose length is higher than the current maximum RLC PDU size are encapsulated.

The AM RLC entity 200 is substantially the same as the AM RLC entity 100, except an encapsulated PDU reassembly entity 240. The receiving side 200b of the AM RLC entity 200 places the received encapsulated PDUs in a separate reassembly buffer (not shown) instead of placing them in the normal reception buffer 228. The encapsulated PDU reassembly entity 240 reassembles the encapsulated PDUs. When reassembly of the encapsulated PDUs are complete, the underlying PDU, (i.e., the negatively acknowledged RLC PDU), is moved into the reception buffer 228 and successful reassembly is indicated to the transmitting side 200a of the AM RLC entity 200 for acknowledgement of the underlying RLC PDU sequence number.

In order to unambiguously indicate the first and last PDUs encapsulating the negatively acknowledged RLC PDU, the transmitting side 200a of the AM RLC entity 200 may be constrained to use consecutive sequence numbers for the encapsulating PDUs, and indicate the last encapsulating PDU with a flag, (e.g., one bit), to allow the receiving side of the peer AM RLC entity to determine at which point reassembly can be completed.

The header information for the encapsulating RLC PDU is same to the conventional RLC header except that an indication is added to indicate whether the incoming PDU is a normal RLC PDU or an encapsulating RLC PDU. Several options are possible for this indication. A currently reserved bit sequence for the HE field in the RLC header may be used. For instance, the sequence "11" is currently reserved. The sequence "110" may be used to indicate that the PDU encapsulates a segment of a previously negatively acknowledged RLC PDU, while the sequence "111" is reserved for future use. An additional bit after the sequence may indicate whether the PDU contains the last segment of the encapsulated PDU. A special bit sequence may be used for the length indicator, followed by the flag for the last segment. A 1 bit field (encapsulation flag) may be added in the header for the new version of the RLC protocol for this purpose, (this field may be present in every RLC PDU), followed by a flag for the last segment for these PDUs which have the encapsulation flag set.

In accordance with a third embodiment, if the RLC PDU size is greater than the maximum RLC PDU size when an RLC PDU needs to be retransmitted, the AM RLC entity 100 may re-segment the RLC SDU corresponding to that RLC PDU. One extra field is added to the RLC header to indicate version of RLC SDU segmentation. The new RLC PDUs are stored in the retransmission buffer 110. RLC PDUs corresponding to older versions of the RLC SDU are discarded.

In addition, if the original RLC PDU contains several RLC SDUs and/or segments of RLC SDUs, and the original RLC PDU is larger than the maximum RLC PDU, the RLC PDU may be assembled differently. The SDUs contained in the original RLC PDU may be combined and/or segmented differently to fit into the new maximum RLC PDU size. This scheme may not support RLC PDU SN reuse. Therefore, new SDU sequence numbers or packet data convergence protocol (PDCP) SN re-use may be applied.

The receiving side 100b of the RLC entity 100 is responsible for reporting status information of AMD PDUs. The status reports may vary depending on which segmentation scheme is used. The status report may be triggered as in the prior art. The number of retransmission and discard timers may be directly related to the original RLC PDU, or may be independent for each segment, or a combination of the two. Optionally, a maximum RLC PDU size change may trigger the RLC receiver to send a status report to the RLC transmitter.

A status report may be sent on a segmented RLC PDU basis, (i.e., segment level based status), if the original RLC PDU has been segmented. The status report may include an SN, a segment information, (i.e., number), and/or a sub-segment information, (i.e., number). If all segments are successfully received, the status report may include only the SN, and the peer RLC entity may deduce that all segments corresponding to that SN are successfully received and discard all segments corresponding to the SN in the retransmission buffer.

Alternatively, a status report may be sent once all segments of the original RLC PDU have been received successfully. The status report is sent on an RLC PDU basis, (i.e., no segment information), as conventionally done, (i.e., sequence number is indicated in the status report). If the RLC receiver detects that a segmented RLC PDU has been received with an updated version indicator, the RLC receiver may discard all successful RLC PDUs which contain an older version indicator.

In status reporting of re-segmented RLC SDUs, the status report may be RLC SDU-based or RLC PDU-based. If the RLC receiver detects that a different version of the RLC PDU has been received with an updated version indicator, the RLC receiver may discard all successful RLC PDUs which contain an older version indicator.

Although the features and elements are described in embodiments in particular combinations, each feature or element can be used alone without the other features and elements of the embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

The invention claimed is:

1. A method for acknowledgement mode (AM) radio link control (RLC) segmentation, comprising:
    segmenting/concatenating at least one RLC service data unit (SDU) to generate a RLC protocol data unit (PDU) of a first size, wherein the first size is within a maximum size associated with a first transmission opportunity;
    including header information in the RLC PDU, wherein the header information comprises a sequence number (SN) of the RLC PDU;
    transmitting the RLC PDU;
    storing the RLC PDU in a retransmission buffer;
    receiving a status report to indicate a transmission status of the RLC PDU;
    segmenting the RLC PDU to generate a RLC PDU segment of a second size, wherein the second size is within a maximum size associated with a second transmission opportunity;
    including segment information in the RLC PDU segment, the segment information comprising a segment start field that indicates a position of a first byte of the RLC PDU segment in the RLC PDU and a segment last field that indicates a position of a last byte of the RLC PDU segment in the RLC PDU; and
    transmitting the RLC PDU segment.

2. The method of claim 1, wherein header information of the RLC PDU is included in the RLC PDU segment.

3. The method of claim 2, wherein the sequence number (SN) of the RLC PDU is included in an RLC header of the RLC PDU segment.

4. The method of claim 1, wherein the first size of the re-RLC PDU is determined by a transmitter.

5. The method of claim 1, wherein the status report comprises a negative acknowledgement (NACK) from a peer RLC entity.

6. The method of claim 5, wherein the status report further comprises the SN of the RLC PDU.

7. The method of claim 1, further comprising receiving a status report for the RLC PDU segment comprising the SN of the RLC PDU and the segment information of the RLC PDU segment.

8. The method of claim 1, further comprising receiving a positive acknowledgement from a peer RLC entity for the RLC PDU segment.

9. A user equipment (UE) comprising:
    a receiver;
    a retransmission buffer;
    a transmitter; and
    one or more processors to:
        segment/concatenate at least one radio link control (RLC) service data unit (SDU) to generate a RLC protocol data unit (PDU) of a first size, wherein the first size is determined by the transmitter;
        include header information in the RLC PDU, wherein the header information comprises a sequence number (SN) of the RLC PDU;
        transmit, via the transmitter, the RLC PDU;
        store the RLC PDU in the retransmission buffer;
        receive, via the receiver, a status report comprising a negative acknowledgement (NACK) for the RLC PDU;
        segment the RLC PDU to generate a RLC PDU segment of a second size, wherein the second size is within a maximum size associated with a second transmission opportunity;
        include segment information in the RLC PDU segment, the segment information comprising a segment start field that indicates a position of a first byte of the RLC PDU segment in the RLC PDU and a segment last field that indicates a position of a last byte of the RLC PDU segment in the RLC PDU; and
        transmit, via the transmitter, the RLC PDU segment.

10. The UE of claim 9, further comprising a display, a memory, a speaker, and a microphone.

11. The UE of claim 10, further comprising a Blue-tooth module and a wireless local area network (WLAN) module.

12. The UE of claim 9, wherein the RLC PDU is transmitted to a base station.

13. One or more non-transitory computer readable media with executable instructions stored thereon that, when executed, cause a user equipment (UE) to:
    segment/concatenate at least one radio link control (RLC) service data unit (SDU) to generate a RLC protocol data unit (PDU), the RLC PDU being within a first maximum RLC PDU size for a first transmission opportunity;

store the RLC PDU in a retransmission buffer;

segment the RLC PDU to generate a RLC PDU segment if a status report comprising a negative acknowledgement (NACK) is received for the RLC PDU and a size of the RLC PDU is greater than a second RLC PDU size for a second transmission opportunity;

include segment information in the RLC PDU segment, the segment information comprising a segment start field that indicates a position of a first byte of the RLC PDU segment in the RLC PDU and a segment last field that indicates a position of a last byte of the RLC PDU segment in the RLC PDU;

store the RLC PDU segment in the retransmission buffer; and transmit the RLC PDU segment.

14. The media of claim 13, wherein header information of the RLC PDU is included in the RLC PDU segment.

15. The media of claim 14, wherein a sequence number (SN) of the RLC PDU is included in an RLC header of the RLC PDU segment.

16. The media of claim 13, wherein the size of the RLC PDU is determined by a transmitter.

17. The media of claim 13, further comprising receiving a positive acknowledgement for the RLC PDU segment.

18. The media of claim 13, further comprising transmitting the RLC PDU.

19. The media of claim 13, wherein the status report further comprises the SN of the RLC PDU.

20. The media of claim 13, further comprising discarding the RLC PDU segment for which a positive acknowledgment is received.

* * * * *